United States Patent
Hild et al.

(10) Patent No.: US 12,291,582 B2
(45) Date of Patent: *May 6, 2025

(54) PROCESS FOR PRODUCING A CROSSLINKED CELLULOSE ETHER

(71) Applicant: Dow Global Technologies LLC, Midland, MI (US)

(72) Inventors: Alexandra Hild, Soltau (DE); Jöerg Neubauer, Hamburg (DE); Sonja Menz, Wedemark (DE); Matthias Sprehe, Walsrode (DE); Michael Schreck, Walsrode (DE)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 686 days.

This patent is subject to a terminal disclaimer.

(21) Appl. No.: 17/310,470

(22) PCT Filed: Apr. 17, 2020

(86) PCT No.: PCT/US2020/028671
§ 371 (c)(1),
(2) Date: Aug. 5, 2021

(87) PCT Pub. No.: WO2020/223039
PCT Pub. Date: Nov. 5, 2020

(65) Prior Publication Data
US 2022/0127381 A1    Apr. 28, 2022

Related U.S. Application Data

(60) Provisional application No. 62/841,383, filed on May 1, 2019.

(51) Int. Cl.
| | | |
|---|---|---|
| *C08B 11/08* | (2006.01) | |
| *C04B 24/38* | (2006.01) | |
| *C08B 15/00* | (2006.01) | |

(52) U.S. Cl.
CPC ......... *C08B 15/005* (2013.01); *C04B 24/386* (2013.01); *C08B 11/08* (2013.01)

(58) Field of Classification Search
CPC ....... C08B 15/005; C08B 11/08; C08B 11/02; C08B 11/20; C04B 24/386; C04B 24/383; C04B 28/02; C04B 28/14; C04B 28/023; C04B 40/0608; C04B 2103/0062; C04B 20/02

See application file for complete search history.

(56) References Cited

U.S. PATENT DOCUMENTS

| | | | |
|---|---|---|---|
| 4,068,068 | A | 1/1978 | Holst et al. |
| 4,175,183 | A | 11/1979 | Ayers et al. |
| 4,321,367 | A | 3/1982 | Cheng et al. |
| 6,235,893 | B1 | 5/2001 | Reibert et al. |
| 6,958,393 | B2 | 10/2005 | Schlesiger et al. |
| 7,041,168 | B2 | 5/2006 | Schlesiger et al. |
| 2005/0034636 | A1 | 2/2005 | Schlesiger et al. |

FOREIGN PATENT DOCUMENTS

| | | | | |
|---|---|---|---|---|
| JP | 2011195789 A | * | 10/2011 | |
| KR | 2013067748 | | 6/2013 | |
| WO | 2015165588 | | 11/2015 | |
| WO | WO-2015165588 A1 | * | 11/2015 | ............. C08B 11/00 |
| WO | 2017004119 | | 1/2017 | |
| WO | 2017004120 | | 1/2017 | |

OTHER PUBLICATIONS

Machine Translation of JP2011195789A (Year: 2011).*
U.S. Appl. No. 17/428,774 claim set (Year: 2021).*
U.S. Appl. No. 17/428,774 ADS (Year: 2021).*
Bartelmus, "Die Analytik von Celluseathergruppen" Z. Anal. Chem, 1976, Abstract, vol. 286.
Donges, "Non-Ionic cellulose Ethers", British Polymer Journal, 1990, pp. 315-326, vol. 23.
Jones, Crosslinking of Cotton Cellulose with Diglycidyl Ether, Journal of Applied polymer science, 1961, pp. 714-720, vol. V, issue No. 18.

* cited by examiner

*Primary Examiner* — Yih-Horng Shiao
*Assistant Examiner* — Hoi Yan Lee

(57) ABSTRACT

A process for producing a crosslinked cellulose ether including the steps of (i) contacting at least one cellulose material with a mixture comprising (ia) at least one crosslinking agent and (ib) at least one alkalization reagent to form an activated cellulose material; and (ii) contacting the activated cellulose material of step (i) with at least one etherification reagent; wherein the at least one etherification reagent reacts with the activated cellulose material to form the crosslinked cellulose ether; and a crosslinked cellulose ether produced by the above process.

10 Claims, 1 Drawing Sheet

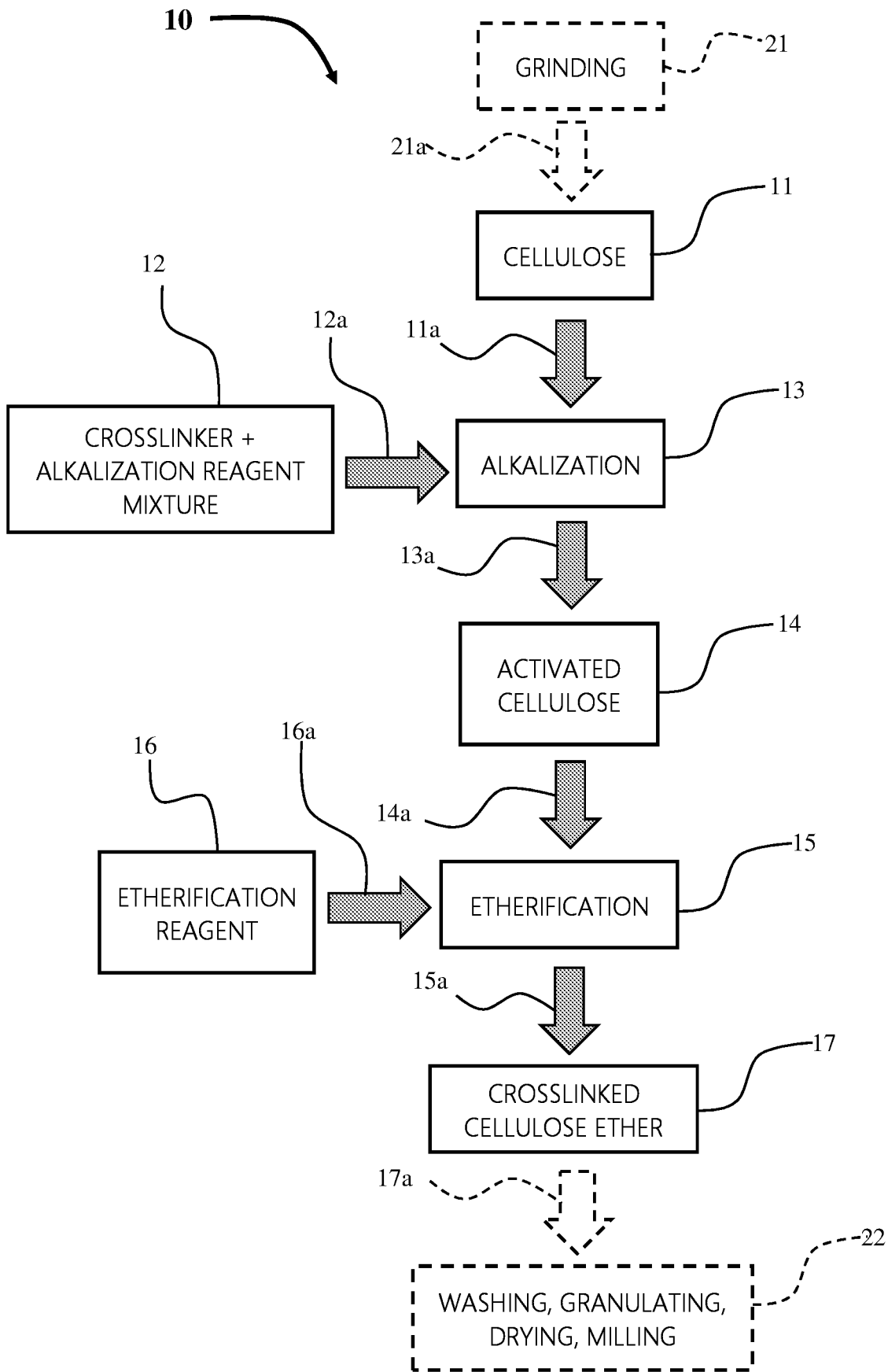

PROCESS FOR PRODUCING A CROSSLINKED CELLULOSE ETHER

FIELD

The present invention relates to a process for producing a crosslinked cellulose ether and a crosslinked cellulose ether prepared by such process.

BACKGROUND

Cellulose derivatives, such as cellulose ethers owing to their excellent properties and physiological safety, are used widely, for example as thickeners, adhesives, binders and dispersants, water retention agents, protective colloids, stabilizers, and suspension, emulsifying and film-forming agents. In addition, cellulose ethers are known to be employed in drymix mortars in various construction applications to improve the rheology of the mortar. Also, cellulose ethers are used in mortars to impart water retention properties that limit loss of water from the mortar to absorbing substrates. This ensures that the hydraulic binder (cement or gypsum) has sufficient water available during the setting reaction resulting in high mechanical strength of the final product. The lack of water would result in incomplete setting, poor mechanical strength, crack formation and low abrasion resistance.

Heretofore, cellulose ethers have been produced by well-known conventional processes which includes subjecting a cellulose starting material, such as cellulose pulp, to two process operations (steps or stages): (1) an alkalization operation and (2) an etherification operation. The well-known state-of-the-art conventional procedure for making a cellulose ether, is illustrated and described, for example, in U.S. Pat. No. 6,235,893 B1. The conventional process includes the steps of: (1) alkalizing a cellulose pulp; and (2) etherifying the alkalized cellulose pulp to form a cellulose ether. For example, in the conventional processes, the cellulose pulp is alkalized with sodium hydroxide and etherified with methyl chloride and alkylene oxide (ethylene oxide or propylene oxide). And, each one of the above operations of alkalization and etherification can be carried out stepwise, i.e. in one step or in two or more distinct and separate steps, and each step can be carried out for a predetermined period of time at specified process conditions of pressure and temperature. After the cellulose ether is made, the cellulose ether can be subjected to further desired process steps such as: (3) washing the cellulose ether; (4) drying the cellulose ether; and (5) milling the cellulose ether to a particulate form. Typically, the alkalization and etherification operations can be carried out in a single reactor or two or more reactors.

More recently, improvements have been made to conventional processes for making cellulose ethers by using crosslinking technology to make crosslinked cellulose ethers. Crosslinking technology involves cellulose ethers that can be chain extended or crosslinked using bifunctional crosslinking agents like methylene dichloride, epichlorohydrin or various diglycidylethers. For example, U.S. Pat. No. 6,958,393 B2 (equivalent to EP1384727B9) discloses a method of making a polyether group containing crosslinked cellulose ether using crosslinking technology. The crosslinked cellulose ether is produced by crosslinking a cellulose ether at 90 degrees Celsius (° C.) or less, in an inert atmosphere, e.g. nitrogen ($N_2$), in the presence of a polyether group containing crosslinking agent and in the presence of caustic or alkali. The crosslinking of the cellulose ether takes place in a reactor in which the cellulose ether itself is made and in the presence of the caustic or alkali.

One advantage of using a crosslinked cellulose ether, for example in a drymix mortar formulation, as opposed to a pure non-crosslinked cellulose ether is that by crosslinking a cellulose ether with a crosslinking agent, the viscosity of the aqueous solution of a cellulose ether can be increased and the resultant crosslinked cellulose ether having an increased or high viscosity can still remain water-soluble in an aqueous solution. And, a crosslinked cellulose ether having an increased or high viscosity, produced using crosslinking technology, can be used, for example in mortar applications, at a reduced dosage level without compromising product and application performance. Cellulose ether is a relatively expensive ingredient used in mortar formulations, and any reduction of the cellulose ether dosage in the formulation can save formulation costs.

In previously known processes, the dosage of a crosslinking agent, used in crosslinking a cellulose ether, is kept very low so as to prevent "over crosslinking" which, in turn, provides a crosslinked polymer product which remains water-insoluble and does not contribute to the viscosity of the aqueous solution. However, a uniform distribution of a small amount of crosslinking agent, added to the contents of a large reactor, is very difficult to realize using the previously known processes.

"Over crosslinking" herein, with reference to crosslinking a cellulose ether, means that the reaction of the cellulose ether with a crosslinking agent is too extensive and results in a 3-dimensional network of covalently linked cellulose ether chains; and such chains are not water soluble and appear as gel particles in an aqueous phase. Over crosslinking results in a reduction of water solubility of the cellulose ether in the aqueous solution. When over crosslinking occurs in a cellulose ether a reduced amount of the resulting crosslinked cellulose ether is soluble in the aqueous solution; and the appropriate viscosity of the crosslinked cellulose ether is unable to be achieved in the aqueous solution. In other words, over crosslinking results in an undesirable decrease in viscosity. An over crosslinked cellulose ether shows a degree of crosslinking that results in a reduced water solubility compared to a non-over crosslinked cellulose ether. The known process for crosslinking a cellulose ether described, for example, in U.S. Pat. No. 6,958,393 B2 includes several steps such as: (1) a cellulose is alkalized with aqueous alkali metal hydroxide solution in the presence of a suspension medium; (2) the alkalized cellulose is reacted with one or more alkylene oxides; (3) the alkalized cellulose is further reacted with an alkyl halide present in the suspension medium; (4) subsequently or simultaneously, the alkalized cellulose is reacted with a crosslinking agent using a specified amount of crosslinking agent; (5) further alkali metal hydroxide and/or alkalizing agent is added to the reaction mixture of step (4); and (6) the resultant crosslinked cellulose ether is purified and dried.

The process described in U.S. Pat. No. 6,958,393 B2 requires: (1) the addition of a crosslinking agent during the etherification step of the process at a high pressure; (2) the use of epichlorohydrin (ECH) as a crosslinking agent in some instances; (3) the addition of a low level of crosslinking agent in a pure state or dispersed in an organic solvent; (4) the uniform distribution of the crosslinking agent at the limited low level of pure crosslinking agent; and (5) the exhibition of good performance of the resulting products of the process. In addition to the above requirements, the use of the above known process, in some instances, has resulted in poor distribution of the crosslinking agent in the reactor; and has developed over crosslinking and an undesirable decrease in viscosity of the crosslinked cellulose product. And, the efficiencies of the known process of U.S. Pat. No. 6,958,393 B2 do not readily transfer from the laboratory scale, to the pilot plant scale, and/or ultimately to the full-size industrial plant scale. Thus, a greater degree of expertise, knowledge and technical effort is needed to make the above known process work on a plant scale; and under the conditions of the known process.

It has been found that to carry out a successful crosslinking process, it is necessary to achieve a uniform distribution of the crosslinking agent when the crosslinking agent is introduced into the process at a low amount. The uniform distribution has to be achieved to create the desired branched polymer and to prevent local over dosage which leads to over crosslinking. Over crosslinking (i.e., high levels of crosslinking) leads to localized crosslinked networks and increased levels of local insoluble materials. It has also been found that over crosslinking may depend on when and at what stage, step or operation of the crosslinked cellulose ether production process a crosslinking agent is introduced into the process. For example, a crosslinking agent might be introduced or added before, during, or after the etherification operation. However, since the alkalization and etherification reactions are exothermic, there are many factors that can affect whether or not over crosslinking occurs in the process. Factors can include, for example, the reaction time, type of crosslinking agent introduced into the process, the amount of crosslinking agent introduced into the process, how the crosslinking agent is introduced into the process, the process conditions at the point of introducing the crosslinking agent into the process, and over what period of time is the crosslinking agent introduced into the process.

It is desired, therefore, to provide a new improved process for producing a crosslinked cellulose ether that can be useful and implemented on an industrial plant scale with a higher efficiency than known conventional processes; and at the same time, wherein the performance of the resulting product of such improved process remains the same or better than known products of conventional processes.

SUMMARY

The problems of the prior art processes can be solved using the process of the present invention. The present invention is directed to a novel process for preparing a crosslinked cellulose ether (herein referred to as "XCE") having an appropriate increased viscosity.

The present invention is directed to a novel low-pressure (e.g., at atmospheric pressure) process for preparing a XCE having an enhanced viscosity of the aqueous solution. The present invention relates to providing a crosslinking agent dosage in the cellulose ether production process at atmospheric pressure which enables the production of XCEs, such as hydroxyethyl methylcellulose derivatives, which not only eliminates a cost intensive high-pressure dosage step of the known prior art processes, but also provides a product with increased viscosity of the aqueous solution. Such product can be used at reduced dosage, for example in drymix mortar formulations, and still provide appropriate performance properties.

In one embodiment, the crosslinking agent dosage takes place at a low-pressure step which, in the present invention process is, for example, the alkalization step of the process which is a step prior to the high-pressure etherification process step. In the present invention, control of the dosage of the crosslinking agent provides an economical way to produce a XCE product with the good rheological performance (higher viscosity level), but with less technical effort. Also, the dosage concept of the present invention has the further benefit of an enhanced process window for crosslinking agent addition compared to known processes.

In one preferred embodiment, the present invention is directed to a process for producing a XCE including the steps of (i) contacting at least one cellulose material with a mixture comprising (ia) at least one crosslinking agent and (ib) at least one alkalization reagent to form an activated cellulose material; and (ii) contacting the activated cellulose material of step (i) with at least one etherification reagent; wherein the at least one etherification reagent reacts with the activated cellulose material to form the XCE. The contacting step (i) can be carried out, for example, at a pressure of less than or equal to (≤) 500 kilopascals (kPa); and at a temperature of ≤50° C. The contacting step (ii) carried out, for example, at a pressure of greater than or equal to (≥) 1,500 kPa; and at a temperature of ≥to 70° C. Optionally, the above process can include one or more additional steps of purifying, washing, drying, granulating, and milling the XCE obtained from step (ii).

In another embodiment, the present invention is directed to a process for producing a crosslinked cellulose ether including the steps of: (A) mixing (a) at least one crosslinking agent with (b) at least one alkalization reagent to form a crosslinking agent/alkalization reagent mixture; (B) contacting at least one cellulose material with the mixture of step (A) to form an activated cellulose material; (C) contacting the activated cellulose material of step (B) with at least one etherification reagent; wherein the at least one etherification reagent reacts with the activated cellulose material to form a crosslinked cellulose ether; and (D) optionally, subjecting the crosslinked cellulose ether to one or more steps of purifying, washing, drying, granulating, and milling.

In still another preferred embodiment, the crosslinking agent is introduced or added to the process during the alkalization operation; and the crosslinking agent is added to the process in the form of a mixture of the crosslinking agent and the alkalization reagent.

In yet another embodiment, the present invention is directed to a XCE produced by the above process. The XCE produced by the above process of the present invention beneficially has high water solubility leading to an increased viscosity in aqueous solution when compared to a non-crosslinked cellulose ether.

Even still another embodiment of the present invention relates to a drymix mortar-forming composition including the above XCE.

Surprisingly, it has been discovered that by using the present invention process and introducing a desired low dosage of a uniformly distributed crosslinking agent compound under low-pressure process conditions (e.g., from 100 kPa to 500 kPa), not only advantageously simplifies the overall process of producing the XCE, but also provides an efficient production process for making a XCE. For example, the dosage of crosslinking agent introduced into the present invention process is carried out in an earlier step of the present invention process, i.e., the dosage of the crosslinking agent used in the present invention process is introduced or added during the alkalization of the cellulose starting material operation of the present invention process; whereas, the dosage of the crosslinking agent used in known conventional processes is introduced or added during the etherification operation. Thus, the addition of the desired uniformly distributed crosslinking agent dosage occurs at a low-pressure point or step of the present invention process as opposed the addition of a crosslinking agent dosage at a high-pressure point or step of conventional processes. In a typical conventional process, an alkalization reagent, such as sodium hydroxide (NaOH or caustic soda), is added to a cellulose to perform the alkalization step. However, when the crosslinking agent is combined with the alkalization reagent as is done in accordance with the present invention, the alkalization reagent also functions as a diluting agent for the crosslinking agent to enable a uniform distribution of the crosslinking agent in the process. Beneficially, there may be no need to add further amounts of crosslinking agent at the alkalization step or at any other steps later in the process scheme of the present invention.

Some other benefits of the present invention process include, for example, (1) control of the dosage of the crosslinking agent can result in a XCE with an advantageous desired (and appropriate) increased viscosity level that avoids over crosslinking and particularly in use in a large scale plant process; (2) the crosslinking agent has a low water solubility and forms a dispersion in an alkali solution; (3) a low amount of crosslinking agent is required in the process providing a higher viscosity at a low amount of crosslinking agent dosage (4) a uniform distribution of the low amount of crosslinking agent is possible in a large plant scale process; (5) the process requires no additional spray devices in the reactor used to carry out the process of the present invention;

Furthermore, advantageously the process of the present invention provides a XCE product with the same or better performance properties of known products prepared by known processes. In addition, advantageously the process of the present invention can be performed on a large plant scale with the crosslinking agent dosage taking place at the alkalization step of the present invention process and without the problem of over crosslinking.

BRIEF DESCRIPTION OF THE DRAWINGS

FIG. 1 is a schematic flow diagram showing a process of the present invention.

DETAILED DESCRIPTION

A "uniform distribution" in the present disclosure and with reference to contacting a cellulose fiber to a different component, herein means the cellulose fiber and the other component have the same distribution in all smallest volume elements of a given volume. The smallest volume element is a cube with an edge length of ten times the mean particle size of the cellulose fiber in the given volume.

In general, a process for producing a XCE includes an alkalization step and an etherification step. A step of grinding the cellulose starting material can be carried out, and typically desired, prior to the alkalization step; and a washing (hot $H_2O$)/granulation step and/or a drying/milling step of the XCE can be carried out after the etherification step. During the alkalization operation of the process, a crosslinking agent is introduced or added to the alkalization operation to provide crosslinking of the cellulose material later downstream of the process such as during the etherification operation.

In one broad embodiment, the present invention relates to crosslinking agent dosage and crosslinking agent addition to a process for producing a XCE product. In one preferred embodiment, the crosslinking agent is added to, or dosed into, the alkalization step or operation of the process combined with an alkalization reagent in the form of a mixture of the crosslinking agent and the alkalization reagent.

The small dosage of crosslinking agent used in the present invention results in an ultra-high viscous product with the same rheological performance as known products (e.g., a high viscosity measured in millipascal seconds [mPa·s]) but with a crosslinking agent having a higher efficiency. Advantageously, the result is a reduced level of undesired side reactions and minimum impact on waste water treatment. Also, in the present invention, the dosage of costly crosslinking agents can be reduced and over crosslinking is prevented.

The crosslinking agent dosage used in the present invention has the benefit of using an alkali/water as a suspension medium (or diluting agent) for the crosslinking agent, so that the objective of providing a uniform distribution of the dispersion in the cellulose material during the dosage step can be achieved more easily compared to conventional processes. In addition, the present invention using the alkali/water suspension medium does not have the safety issues and environmental concerns in a XCE manufacturing plant as do the processes known in the art which use an organic solvent as a diluting agent for a crosslinking agent.

Further benefits of the present invention process include, for example, (1) the process uses a readily available crosslinking agent based on diglycidyl ether chemistry such as Epilox M 985 or Epilox P13-42; and (2); the crosslinking agent/alkali/water dispersion is non-toxic. In contrast, known processes use epichlorohydrin (ECH) as the crosslinking agent system; and such known processes suffer from several disadvantages, including, for example, ECH is known to be toxic, is a carcinogenic, and has a low boiling point (116° C.)/low molecular weight (Mw) (92.53 g·mol$^{-1}$). Table I describes a comparison of the physical data of Epilox products versus ECH.

TABLE I

Physical Data of Crosslinking Agents

| Crosslinking Agent | Density (g/cm³ at [@] 20° C.) | Dynamic Viscosity (mPa · s, @25° C.) | Solubility in Water (g/L, @25° C.) | Boiling Point (° C.) | Molar Mass (g/mol) |
|---|---|---|---|---|---|
| Epilox M 985 | 1.06-1.06 | 40-90 | less than 100 | greater than 200 | 850-1,000 |
| Epilox P13-42 | 1.04 | 40-70 | less than 100 | greater than 200 | 610-700 |
| Epichlorohydrin | 1.18 | 1.03 | 65.9 | 117 | 92.5 |

The process of the present invention provides an irreversibly XCE with beneficial rheological behavior and advantageous properties in various fields of application. The present invention uses a C10-C24 alkyl bifunctional compound (oxirane and/or halide) and polypropylene glycol diglycidyl ethers as a crosslinking agent to prepare a XCE. The process of the present invention uses a crosslinking agent/alkali/water mixture or dispersion to introduce the crosslinking agent into the alkalization step of the process. Prior art processes that use ECH as a crosslinking agent to prepare a XCE often results in insoluble cross-linked product and, the crosslinking agent useful in the present invention is less of an environmental concern than ECH.

Generally, the crosslinking agent/alkali dispersion composition useful in the present invention includes a mixture of: (i) a crosslinking agent and (ii) an alkalization reagent in water; and (iii) any other optional components desired.

The crosslinking agent that is used to prepare the cellulose ether of the present invention includes, for example, one or more crosslinking agents known in the art. A crosslinking agent having a non-water-soluble property or having a solubility of less than (<) 10 percent (%) in water is typically used. For example, the non-water solubility property of the crosslinking agent allows optimization of desirable side reactions with the hydroxyl (—OH) groups of the cellulose backbone to take place and minimizes the undesirable side reactions with the —OH groups of the NaOH used in the alkalization operation.

Crosslinking agents suitable for use in the present invention include, for example, compounds having a polyoxyalkylene or polyalkylene glycol group and two or more, preferably, two crosslinking groups, such as halogen groups, glycidyl or epoxy groups, or ethylenically unsaturated groups, e. g. vinyl groups, that form ether bonds with the cellulose ether in crosslinking the cellulose ether. Suitable bifunctional compounds include, for example, 1, 2-dichloro (poly) alkoxy ethers, dichloropolyoxyethylene, diglycidyl polyalkoxy ethers, diglycidyl phosphonate, divinyl polyoxyalkylenes containing a sulphone group; and mixtures thereof. Compounds which bear two different functional groups can also be used. Examples of the compounds containing two different functional groups include ECH, glycidyl (poly) oxyalkyl methacrylate; and mixtures thereof.

In one preferred embodiment, the crosslinking agent useful in the present invention can be based on diglycidyl ether chemistry. For example, the crosslinking agent can be a diglycidylether type crosslinking agent as illustrated by the following chemical Structure (I):

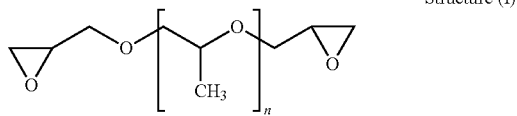

Structure (I)

where, in the above Structure (I), "n" can be from 3 to 25 in one embodiment, from 7 to 20 in another embodiment, and from 9 to 15 in still another embodiment.

Exemplary of some of the commercial crosslinking agents useful in the present invention, for example, crosslinking agents based on diglycidyl ether chemistry, include Epilox P13-42, wherein the Epilox P13-42 product is Structure (I) when n equals (=) approximately (~) 8; and Epilox M 985, wherein the Epilox M 985 product is Structure (I) when n=~13 (both Epilox products above are available from Leuna-Harze GmbH). Epilox M 985 crosslinking agent is a linear poly(propyleneglycol) diglycidylether made from polypropylene glycol (PPG).

Crosslinking agents such as Epilox M 985 and Epilox P13-42 are examples of preferred embodiments because beneficially such crosslinking agents: (1) are non-toxic; and (2) have a very high boiling point (e.g., greater than (>) 200° C.)/high Mw (e.g., above 600 grams per mole [g/mol]). This is in contrast to some of the known crosslinking agent systems used in the prior art, such as ECH, which: (1) is toxic and/or carcinogenic; and (2) has a low boiling point (e.g., 116° C.)/low Mw (e.g., 92.53 g/mol).

Using crosslinking agents such as Epilox M 985, the building-up of real covalent bonds can take place with the cellulose material. This building of covalent bonds advantageously increases the Mw of a cellulose ether. The cellulose ether with an increased Mw of the present invention, provides a means for reaching beneficial properties, for example, a high viscosity level (e.g., >20% higher compared to the non-crosslinked cellulose ether).

Exemplary of some other advantageous properties exhibited by the crosslinking agent can include lower dosage levels in drymix mortar application without sacrificing performance properties.

In addition, when using the XCE of the present invention, the amount of the XCE necessary to obtain the desired performance, for example when used in a drymix mortar formulation, is reduced compared to a non-crosslinked cellulose ether. Such reduction of XCE dosage, in turn, reduces the cost in use that correlates with the reduced amount of cellulose ether that is necessary to obtain the desired performance, for example, in the application of cementitious tile adhesives.

In general, the amount of crosslinking agent used in the present invention may range from 0.0001 eq to 0.05 eq, where the unit "eq" represents the molar ratio of moles of the respective crosslinking agent relative to the number of moles of anhydroglucose units (AGU) of the cellulose ether. The amount of crosslinking agent used in the process is generally from 0.0005 eq to 0.03 eq in one embodiment and from 0.001 eq to 0.005 eq in another embodiment. When the amount of crosslinking agent used is above 0.05 eq over crosslinking of the XCE occurs; and thus, the cellulose ether becomes insoluble. When the amount of crosslinking agent used is below 0.0001 eq, a viscosity increase of a XCE, for example, in a 1% solution, may not be detectable.

The alkalization reagent (or alkalizing agent) that is used to mix with the crosslinking agent to dilute the crosslinking agent and that is also used during the alkalization step of the present invention process includes, for example, one or more alkalization reagents known in the art. For example, the alkalization reagent includes solutions of an alkali metal hydroxide such as NaOH, potassium hydroxide (KOH), lithium hydroxide (LiOH), and mixtures thereof. Although in some embodiments, the aqueous alkaline solutions of KOH or LiOH are suitable for use as the alkalization reagent, for economic reasons, the alkali metal hydroxide used as the alkalization reagent in the present invention is an aqueous NaOH solution. In a preferred embodiment, the alkali metal hydroxide used in the present invention is a 50% caustic soda, available from The Dow Chemical Company. The alkalization reagent is used to alkalize natural cellulose or cellulose hydrate when carrying out the process of the present invention, in one preferred embodiment, Generally, the alkalization reagent is in the form of a mixture of the alkalization reagent in water (e.g., a 50% NaOH in water); and the concentrations of the aqueous solutions may vary. For example, the aqueous solution ranges from 10 weight percent (wt %) to 90 wt % in one embodiment, from 25 wt % to 75 wt % in another embodiment and from 40 wt % to 60 wt % in still another embodiment, based on weight % water. In a preferred embodiment, the aqueous solution is used as a 50% reagent in water.

The water used in the alkalization reagent is obtained from any source. The different types of water include, for example, tap water, potable water, and deionized water.

The alkalization reagent is formed by mixing the alkalization reagent and water by conventional mixing means prior to or just before mixing the alkalization reagent with the crosslinking agent of the present invention.

In one general embodiment, the process of producing the crosslinking agent/alkalization reagent dispersion or suspension useful in the present invention includes: (a) mixing at least one crosslinking agent with at least one alkalization reagent to form the dispersion. The mixing of the crosslinking agent and alkalization reagent to form the dispersion is carried out by any conventional mixing means such as any horizontal or vertical mixing device; or the mixing can take place by pumping the crosslinking agent into the alkalization reagent; or by the combination of the feeding lines of alkalization agent and crosslinking agent.

Exemplary of one of the advantageous properties exhibited by the crosslinking agent/alkalization reagent dispersion includes the dispersion is easily and uniformly distributed on the cellulose starting material during alkalization.

One broad embodiment, the process of producing the XCE from a cellulose starting material includes the steps of: (a) mixing at least one crosslinking agent with at least one alkalization reagent to form a crosslinking agent/alkalization reagent mixture; (b) contacting at least one cellulose material with the crosslinking agent/alkalization reagent mixture of step (a) to form an activated cellulose material such that the activated cellulose material forms in the presence of the at least one crosslinking agent and at a pressure of $\leq 500$ kPa; and at a temperature of $\leq 50°$ C.; (c) contacting the activated cellulose material of step (b) with at least one etherification reagent in the presence of the at least one crosslinking agent from step (b) to form a XCE; and (d) optionally, carrying out one or more steps of purifying, washing, drying, granulating, and milling the XCE from step (c).

With reference to FIG. 1, there is shown a process of the present invention, generally indicated by reference numeral 10, with various general process operations or steps for producing a XCE having enhanced viscosity of the aqueous solution and useful, for example, in drymix mortar formulations. As shown in FIG. 1, the process includes, for example: a cellulose starting material 11 such as pulp and a dispersion or mixture of a crosslinking agent and an alkalization reagent 12 that proceed, as indicated by arrows 11a and 12a, respectively, to an alkalization step 13.

The general process, as illustrated in FIG. 1, can include optional operations or steps such as, for example, an optional grinding step 21, shown in dotted lines in FIG. 1, which proceeds, as indicated by arrow 21a, to form the cellulose starting material 11 which then proceeds, as indicated by arrow 11a, to the alkalization step 13. Although the grinding step 21 is optional, the grinding step 21 is typically used in a preferred embodiment such that the cellulose starting material 11 (e.g., wood pulp) can be ground to form a ground flock of cellulose which can easily flow and mixed in a reactor. The ground flock is also easily contacted with the crosslinking agent/alkalization reagent mixture 12, such as by spraying the mixture onto the cellulose flock being mixed in the reactor using a conventional spraying means. The ground flock of cellulose 11 can then proceed then proceed, as indicated by arrow 11a, to the alkalization step 13.

In the alkalization step 13, the crosslinking agent/alkalization reagent dispersion mixture 12 comprising (i) an alkalization reagent, such as NaOH (50% in water), and (ii) a crosslinking agent as described above, is mixed with the cellulose material 11 to form, as indicated by arrow 13a, an activated cellulose 14 which then proceeds, as indicated by arrow 14a, to an etherification step 15. In the alkalization step 13 of process 10, a combination or mixture 12 of a crosslinking agent and an alkalization reagent, which for example is in the form of a dispersion or aqueous suspension 12, can be added, as indicated by arrow 12a, to the alkalization step 13. The alkalization step 13 is a low-pressure operation which advantageously is conducive for enabling the addition of the desired predetermined dosage of crosslinking agent, which is present in the crosslinking agent/alkalization reagent dispersion, to the process.

With reference to FIG. 1 again, after the alkalization step 13, an activated cellulose 14 is formed in the alkalization step 13, and the activated cellulose is subjected, as indicated by arrow 14a, to the etherification step 15. In the etherification step 15, an etherification reagent 16 is introduced or added, as indicated by arrow 16a, into the etherification step 17, to contact the activated cellulose 14 and to form a cellulose ether during the etherification step 15. Also, present in the etherification step 15 is the crosslinking agent from the mixture of crosslinking agent/alkalization reagent 12 having been previously introduced, as indicated by arrow 12a, into the alkalization step 13. The crosslinking agent along with the activated cellulose proceeds, as indicated by arrow 14a, to the etherification step 15. During the etherification step 15, the etherification reagent 16 is added, as indicated by arrow 16a, to the etherification step 15. And in the etherification step 15, the etherification reagent and crosslinking agent contact the activated cellulose to form a XCE ether 17 which is formed, as indicated by arrow 15a, in the presence of the crosslinking agent and in the etherification step 15.

In another embodiment, the XCE 17 from the etherification step 15 can proceed, as indicated by arrow 17a, to one or more further optional operations or steps 22, shown in dotted lines in FIG. 1. Although the steps 22 are optional, one or more of the steps 22 are typically desired and used in the process of the present invention. The optional steps 22 can be selected from steps known to those skilled in the art, for example: (1) a hot (e.g., more than 85° C.) water ($H_2O$) washing step for washing the XCE; (2) a granulation step for forming XCE granules; (3) a drying step for drying the granulated XCE; and (4) a milling step for forming the XCE into a powder product. Each of the above optional operations can be carried out in a single step operation; or two or more of the above optional steps can be combined in one operation if desired.

For example, the XCE 17 after the etherification step 15 typically has unwanted volatile by-products and salt (NaCl); and thus, in a preferred embodiment, the XCE 17 after the etherification step 15 is processed, as indicated by arrow 15a, through a washing step 22 to wash out the unwanted volatile by-products, salt, and other impurities from the XCE followed by a drying step 22.

The starting raw material used to make the cellulose ether of the present invention and added into the alkalization operation of the XCE production process is cellulose. Cellulose pulp is typically obtained from, for example, wood pulp or cotton linters pulp. The pulp is typically ground, using conventional grinding means, to provide the cellulose in a powder or flock form. In one preferred embodiment, the suitable cellulose starting material useful in the present invention includes ground wood pulp, ground cotton linters pulp, and mixtures thereof. In another preferred embodiment, wood pulp is used in the process; and the wood pulp is ground into a ground flock of cellulose as a means of making the cellulose feed more flowable when fed into the alkalization process step. Generally, the pulp is ground to an optimum size particle of, for example, from 1,000 microns (μm) to 10 μm in one embodiment and from 900 μm to 25 μm in another embodiment. Coarser particles sizes can make the alkalization step less efficient and finer particles sizes can take too much time for grinding. Before the alkalization step the reactor is typically filled with the pulp flock.

As aforementioned, the crosslinking agent is incorporated or introduced into the process during the alkalization step of the process as mixture with 50% NaOH in water.

The crosslinking agent/alkalization reagent mixture composition is used to alkalize or "activate" the cellulose starting material and to form an "activated cellulose material" in the process of the present invention. The at least one cellulose material is contacted with the crosslinking agent/alkalization reagent mixture wherein the alkalization reagent in the mixture alkalizes the cellulose under process conditions to form the activated cellulose material. The step of contacting the cellulose material with the crosslinking agent/alkalization reagent mixture is carried out, for example, by known means such as by spraying and mixing the crosslinking agent/alkalization reagent mixture into the cellulose.

Generally, the crosslinking agent/alkali composition is added to the alkalization step of the process in the form of a mixture of the crosslinking agent and the alkalization reagent, wherein the concentration of the mixture composition is in the range of, for example, from 1 mol NaOH/mol AGU to 3.5 mol NaOH/mol AGU in one embodiment; from 1.5 mol NaOH/mol AGU to 3.3 mol NaOH/mol AGU in another embodiment; and from 1.8 mol NaOH/mol AGU to 3.1 mol NaOH/mol AGU in still another embodiment.

The crosslinking agent/alkali dispersion added during the alkalization step to contact the cellulose ether can be carried out by any known addition means, for example, by uniformly spraying and any means that enables a uniform distribution of the NaOH, to ensure a sufficient activation of the cellulose pulp.

The alkalization step of the process is carried out under low pressure and low temperature conditions. For example, the pressure of the alkalization step is in the range of from 0 kilopascals (kPa) to 500 kPa in one embodiment, from 100 kPa to 400 kPa in another embodiment and from 200 kPa to 300 kPa in still another embodiment. The above pressure ranges are the typical pressure level ranges in the reactor during the alkalization step. And, for example, the temperature of the alkalization step of the process is in the range of from 10° C. to 50° C. in one embodiment, from 15° C. to 45° C. in another embodiment, and from 20° C. to 40° C. in still another embodiment. The above temperature ranges are the typical temperature ranges in the reactor during the alkalization step. Higher temperature used in the present invention process will result in an undesired pressure increase.

To produce a cellulose ether in accordance with the process of the present invention, an etherification reagent is mixed with the activated cellulose material prepared in the alkalization step described above. The etherification reagent used for preparing the cellulose ether includes, for example, one or more etherification reagents known in the art. For example, the etherification reagent can include ethylene oxide (EO), propylene oxide (PO), butylene oxide (BO), methyl chloride (MCl), ethyl chloride, chloroacetic acid, and mixtures thereof. In one preferred embodiment, the etherification reagent useful in the present invention is, for example, MCl, PO, EO, and mixtures thereof.

The amount of the etherification reagent added into the etherification operation of the XCE production process includes, for example, from 4 mol/AGU to 6 mol/AGU in one embodiment, from 4.5 mol/AGU to 5.5 mol/AGU in another embodiment and from 4.7 mol/AGU to 5.3 mol/AGU in still another embodiment. If the amount of etherification reagent used is <4 mol/AGU, the cellulose ether can be under-substituted and not fully water soluble. If the amount of etherification reagent used is greater than 6 mol/AGU, this higher dosage of etherification reagent can cause the cellulose ether to become hydrophobic and water solubility decreases.

The etherification reagent added to the etherification step to contact the activated cellulose can be carried out by any known addition means, for example, by pumping the components into the reactor.

The etherification step of the process is carried out, for example, in a reaction vessel (reactor) under an inert atmosphere. The inert material used in the process includes, for example, $N_2$, argon, and mixtures thereof. During the etherification step of the process and as the reaction of the reactants occurs and progresses to form a cellulose ether material, the pressure and temperature increase as a result of an exothermic reaction.

As the cellulose ether forms during the etherification step, the pressure of the etherification step of the process is in the range of, for example, from 1,500 kPa to 2,500 kPa in one embodiment, from 1,600 kPa to 2,400 kPa in another embodiment and from 1,800 kPa to 2,200 kPa in still another embodiment. At a pressure <1,500 kPa, the reaction rate is too slow; and at a pressure >2,500 kPa, special high-pressure equipment is necessary.

The etherification step of the process also includes a temperature of, for example, from 60° C. to 100° C. in one embodiment, from 70° C. to 90° C. in another embodiment, and from 75° C. to 85° C. in still another embodiment. At a temperature <60° C., the reaction rate becomes unacceptably slow; and at a temperature >100° C., unwanted side reactions can occur and the pressure increases. If the pressure increases beyond, for example, 2,500 kPa different pressure reactors which can handle high pressures and which are more expensive will be required.

In general, the etherification reagent is added to the etherification step of the process and is mixed with the activated cellulose material; so that the etherification reagent with the cellulose material forms a uniform reaction mixture which, in turn, under the process of etherification, reacts to form a cellulose ether. In the etherification step of the process, the crosslinking agent is also present in the reaction mixture, originating from the alkalization step of the process and carried through to the etherification step without the crosslinking agent reacting at the low temperature of the alkalization step. Upon heating the reaction mixture in the etherification step at the temperature ranges discussed above, the crosslinking agent reacts with the cellulose ether and the crosslinking action of the crosslinking agent with the cellulose ether produces the XCE of the present invention. The crosslinking action of the cellulose ether to produce the XCE of the present invention can take place, for example, before, during or after the etherification process step of the process. In a preferred embodiment, the crosslinking reaction in the present invention is generated during the etherification process step by adding the crosslinking agent to the etherification step. Crosslinking a cellulose ether to produce a XCE is a well-known reaction in the prior art and is described for example in U.S. Pat. No. 6,958,393 B2. In general, the cellulose ether that undergoes crosslinking with the crosslinking agent is typically a mixed cellulose ether that contains hydroxyalkyl groups and alkyl ether groups. For example, in one embodiment of a mixed cellulose ether that contains hydroxyalkyl groups and alkyl ether groups, includes an alkyl hydroxyethyl cellulose, such as hydroxyalkyl methylcellulose.

In some embodiments, exemplary of cellulose ether compounds suitable for use in the present invention include methylcellulose (MC), ethyl cellulose, propyl cellulose, butyl cellulose, hydroxyethyl methylcellulose (HEMC), hydroxypropyl methylcellulose (HPMC), hydroxyethyl cellulose (HEC), methyl hydroxyethyl hydroxy propyl cellulose (MHEHPC), ethylhydroxyethylcellulose (EHEC), methylethylhydroxyethylcellulose (MEHEC), hydrophobically modified ethylhydroxyethylcelluloses (HMEHEC), hydrophobically modified hydroxyethylcelluloses (HMHEC), sulfoethyl methylhydroxyethylcelluloses (SEMHEC), sulfoethyl methylhydroxypropylcelluloses (SEMHPC), sulfoethyl hydroxyethylcelluloses (SEHEC), and mixtures thereof. In some preferred embodiments, the mixed cellulose ether can include, for example, HEMC, HPMC, and mixtures thereof.

For the cellulose ethers useful in the present invention, alkyl substitution is described in cellulose ether chemistry by the term "degree of substitution DS", as determined by the Zeisel method. The DS is the mean number of substituted OH groups per anhydroglucose unit. The methyl substitution may be reported, for example, as DS (methyl) or DS (M). The hydroxy alkyl substitution is described by the term "molar substitution MS", as determined by the Zeisel method. The MS is the mean number of moles of etherification reagent which are bound as ether per mol of anhydroglucose unit. Etherification with the etherification reagent, EO, is reported, for example, as MS (hydroxyethyl) or MS (HE). Etherification with the etherification reagent PO is correspondingly reported as MS (hydroxypropyl) or MS (HP). The side groups are determined using the Zeisel method (reference: G. Bartelmus and R. Ketterer, Z. Anal. Chem. 286 (1977), pp. 161-190).

The XCE produced by the process of the present invention includes, for example, any of the above-mentioned cellulose ethers with a degree of alkyl substitution. For example, a crosslinked HEC has a degree of substitution MS (HE) of 1.5 to 4.5 in one embodiment and has a degree of substitution MS (HE) of 2.0 to 3.0 in another embodiment. In still another embodiment, mixed ethers of methyl cellulose to be crosslinked can be used in the process of the present invention. For example, in the case of HEMC, DS (M) values range from 1.2 to 2.1 in one embodiment, from 1.3 to 1.7 in another embodiment, and from 1.35 to 1.6 in still another embodiment; and MS (HE) values range from 0.05 to 0.75 in one embodiment, from 0.15 to 0.45 in another embodiment, and from 0.20 to 0.40 in still another embodiment. In the case of HPMC, DS (M) values range from 1.2 to 2.1 in one embodiment and from 1.3 to 2.0 in another embodiment; and MS (HP) values range from 0.1 to 1.5 in one embodiment and from 0.2 to 1. 2 in another embodiment.

After the etherification step described above, the XCE product produced can be processed through various additional optional processing steps. For example, the resultant XCE can be washed or purified, granulated, dried and/or ground to a powder form using conventional methods customarily used to produce cellulose derivative products and powders therefrom. For example, before or after washing, the volatile organic constituents present in the XCE can be reduced or removed from the XCE product by distillation or steam stripping. The optional steps are well known to those skilled in the art and any of the methods described above can be used in the process of the present invention. For example, after the etherification step described above, typically the XCE is washed and filtered to produce a filter cake. The filter cake can have a very short shelf-life and may be cumbersome to handle. Thus, of the various optional steps described above, in one preferred embodiment, it is desirous to carry out at least the washing step, the drying step and the milling step of the XCE product to form a dry powder product for ease of handling, packaging and storage purposes.

Some of the advantageous properties exhibited by the XCE made by the above process of the present invention include, for example, (1) a very high viscosity of the aqueous solution is obtained enabling a reduced dosage in, for example, a mortar formulation application.

For example, the increased viscosity of the XCE aqueous solution produced by the process of the present invention includes a viscosity increase of more than 15% in one embodiment, more than 20% in another embodiment, more than 30% in still another embodiment, and more than 50% in yet another embodiment when compared to a non-crosslinked cellulose ether aqueous solution.

In one broad embodiment, the XCE of the present invention may be used as an additive for a drymix mortar formulation, such as renders or cementitious tile adhesives or cement extrusion, and the like. For example, in the process of making the drymix mortar formulation, the process includes the steps of mixing: (I) the XCE described above which is used as a water retention agent; and (II) desired conventional drymix mortar formulation components such as a hydrolytic binder including for example, cement or gypsum.

In a preferred embodiment, a drymix mortar formulation can be prepared mixing the components (I) and (II) (e.g., a physical blend of solid powders) by conventional mixing means as known in the art. Some of the advantageous properties exhibited by the drymix mortar formulation can include, for example, the capability using a lower dosage of the XCE (>10%) resulting in lower formulation costs. To prepare the drymix mortar formulation, generally, the amount of the XCE used as a water retention agent component (I) can be, for example, from 0.01 wt % to 1.0 wt % (based on the total drymix mortar) in one embodiment, from 0.05 wt % to 0.8 wt % in another embodiment and from 0.1 wt % to 0.5 wt % in still another embodiment. Below these levels the water retention of the drymix mortar is insufficient and above these limits the cost of the formulation becomes too high.

The conventional drymix mortar formulation components, component (II), may include components such as hydrolytic binders such as cement, gypsum, fly ash, furnace slag, and the like, and aggregates (sand), fine fillers (calcium carbonate, fumed silica, dolomite, and the like), air entraining agent, defoamers, re-dispersible polymer powders, hydrophobic agents; and mixtures thereof.

EXAMPLES

The following examples are presented to further illustrate the present invention in detail but are not to be construed as limiting the scope of the claims. Unless otherwise indicated, all parts and percentages are by weight.

Various terms and designations used in the Inventive Examples (Inv. Ex.) and the Comparative Examples (Comp. Ex.) are explained as follows:

"HEMC" stands for hydroxyethyl methyl cellulose.
"HPMC" stands for hydroxypropyl methyl cellulose.
"AGU" stands for anhydroglucose units.
"LVN" stands for limiting viscosity number of the pulp as measured according to the procedure described in ISO 5351 (2010).

Various raw materials or ingredients used in the Examples are explained as follows:

Epilox M 985 is a poly(propylene glycol) diglycidylether available from Leuna Harze.

Examples of crosslinking compounds based on diglycidyl ether that can be used in the process of the present invention are described in Eugene W. Jones, Crosslinking of Cotton Cellulose with Diglycidyl Ether, Journal of Applied polymer science, Vol. V, issue no 18, 714-720 (1961).

In general, the Examples which follow are produced according to the principles of the Williamson ether synthesis as described in a reference by R. Donges, "Non-Ionic cellulose Ethers", British Polymer Journal Vol. 23, pp 315-326 (1990); where an "activated" or alkalized cellulose is generated by contacting and treating the ground cellulose with 50% caustic soda. This activation or alkalization step is then followed by an etherification operation using MCl and EO.

The Examples which follow and described in Table II, use HEMC. In addition, the Examples which follow and described in Table II use the same pulp material.

Comparative Example A—Cellulose Ether Synthesized Without Crosslinking Agent (Baseline)

Ground cellulose flock (1.5 mole [mol]) was added to a 5 liters (L) autoclave (reactor). A limiting viscosity number (LVN) of the pulp was measured according to the procedure described in ISO 5351 (2010). The ground cellulose flock (LVN is ≥1,450 milliliters per gram [mL/g]) was added to the autoclave.

After purging the autoclave reactor thrice with $N_2$, the autoclave reactor was heated to 40° C. Then, dimethyl ether (DME, 4.7 mol/mol AGU) and a first charge of methyl chloride ("MCl 1"; 3.2 mol/mol AGU) were added into the autoclave. A first charge of caustic soda ("NaOH 1"; 50%, 1.9 mol NaOH/mol AGU) was added to the autoclave in 3 portions during 2 minutes (min) at a temperature of 40° C. The resulting reaction mixture was held at 40° C. for 30 min. EO (0.45 mol/mol AGU) was then added to the reaction mixture; and the reaction mixture was held for 10 min at 40° C.

The resultant mass was heated to 80° C. in 45 min. At 80° C., a second charge of MCl ("MCl 2"; 1.3 mol/mol AGU) was injected quickly into the mass. Afterwards, a second charge of caustic soda ("NaOH 2"; 0.67 mol/mol AGU) was added to the autoclave in 7 portions over 30 min followed by a 70 min cook-off time at 80° C. After the 70-min cook-off time, the resulting XCE product was formed. The resulting XCE product was then subjected to the following process steps using conventional procedures known in the art: hot water washing, neutralization with formic acid, granulation using a lab granulator (Bosch Mum), drying, and milling.

Comparative Example B—Crosslinked Cellulose Ether Synthesized With Epilox M 985

The same procedure, as described in Comparative Example A, was used in this example except that after EO was added to the reaction mixture and the reaction mixture was held for 10 min at 40° C., the crosslinking agent, Epilox M 985 (0.0030 mol/mol), was added into the autoclave.

Comparative Example C—Crosslinked Cellulose Ether Synthesized With Epichlorohydrin The same procedure, as described in Comparative Example A, was used in this example except that after EO was added to the reaction mixture and the reaction mixture was held for 10 min at 40° C., ECH was used as a crosslinking agent (0.0030 mol/mol premixed with 4 grams [g] of isopropyl alcohol) and the ECH was added into the autoclave.

Inventive Example 1—Crosslinked Cellulose Ether Synthesized With Epilox M 985

Ground cellulose flock (1.5 mol) was added to a 5 L autoclave. After purging the autoclave thrice with $N_2$, the reactor was heated to 40° C. Then, DME (4.7 mol/mol AGU), and MCl 1 (3.2 mol/mol AGU) were injected into the autoclave. NaOH 1 (strength 50%, 1.9 mol NaOH/mol AGU) was added to the autoclave in the following 3 parts: (1) 50% (0.95 mol NaOH/mol AGU) in 3 portions during 2 min at a temperature of 40° C.; (2) 25% as an emulsion with 0.003 mol/mol crosslinking agent with a separate dosage device (bypass); and (3) 25% as a cleaning step with the dosage device. Then, the resulting reaction mixture was held at 40° C. for 30 min. EO (0.45 mol/mol AGU) was added to the reaction mixture; and the reaction mixture was held for 10 min at 40° C.

The resultant mass was heated to 80° C. in 45 min. At 80° C., MCl 2 (1.3 mol/mol AGU) was injected quickly to the mass. Afterwards, NaOH 2 (0.67 mol/mol AGU) was added to the autoclave in 7 portions over 30 min followed by a 70 min cook-off time at 80° C. After the 70-min cook-off time, the resulting XCE product was formed. The resulting XCE product was then subjected to the following process steps using conventional procedures known in the art: hot water washing, neutralization with formic acid, granulation using a lab granulator (Bosch Mum), drying, and milling.

TABLE II

| Example No. | Dosage (mol/mol AGU) | Crosslinking Agent | Process Step | Viscosity (mPa · s @2.52 s$^{-1}$ 1% Aqueous Solution) |
|---|---|---|---|---|
| Comparative Example A | none | none | — | 5,160 |
| Comparative Example B | 0.003 | Epilox M 985 | during etherification | 5,720 |
| Comparative Example C | 0.003 | Epichlorohydrin | during etherification | 2,120 |
| Inventive Example 1 | 0.003 | Epilox M 985 | during alkalization | 6,090 |

The results of carrying out the above Comparative Examples A-C and Inventive Example 1 are described in Table II. It was found that the use of 50% NaOH solution in water (or "50% caustic soda") is beneficial as a diluter for a crosslinking agent which was used in the process of the present invention for producing a XCE. The crosslinking agent in combination with the 50% caustic soda was easily sprayed onto pulp. The stability of the crosslinking agent in a high pH environment, such as 50% caustic soda, was checked by measuring the epoxy equivalent weight (EEW) of the 50% caustic soda containing the crosslinking agent according to DIN16946 before and after storage in 50% NaOH for 30 min at room temperature (RT; about 25° C.). The EEW does not change significantly during this time.

From the results described in Table II, the cellulose ether without any crosslinking agent (Comparative Example A) shows a viscosity of 5,160 mPa·s as a 1% aqueous solution. Adding Epilox M 985 (0.003 mol/mol) during the etherification step increases the viscosity to 5,720 mPa·s (Comparative Example B). However, replacing Epilox M 985 with epichlorohydrin (Comparative Example C) results in a significant loss of viscosity (2,120 mPa·S) caused by the formation of water-insoluble over crosslinked gel particles. In the present invention process, when Epilox M 985 crosslinking agent was added to the process during the alkalization step (Inventive Example 1), a more uniform distribution of crosslinking agent and an optimized viscosity (6,090 mPa·s) of the resulting XCE was generated.

The Examples which follow and described in Table III, use HPMC. The Examples were produced in a laboratory reactor (a 5 L autoclave). All of the Examples were performed using the same pulp material.

Comparative Example D—Cellulose Ether Synthesized Without Crosslinking Agent (Baseline)

Ground cellulose flock (1.5 mol) was added to a 5 L autoclave. After purging the autoclave thrice with N2, the reactor was heated to 40° C. Then, DME (4.7 mol/mol AGU), and MCl 1 (3.2 mol/mol AGU) were added into the autoclave. NaOH 1 (strength 50%, 1.9 mol NaOH/mol AGU) was added to the autoclave in 3 portions during 2 min at a temperature of 40° C. The reaction mixture was held at 40° C. for 30 min. PO (0.45 mol/mol AGU) was then added to the reaction mixture; and the reaction mixture was held for 10 min at 40° C.

The resultant mass was heated to 80° C. in 45 min. At 80° C., MCl 2 (1.3 mol/mol AGU) was injected quickly to the mass. Afterwards, NaOH 2 (0.67 mol/mol AGU) was added to the autoclave in 7 portions over 30 min followed by a 70 min cook-off time at 80° C. After the 70-min cook-off time, the resulting XCE product was formed. The resulting XCE product was then subjected to the following process steps using conventional procedures known in the art: hot water washing, neutralization with formic acid, granulation using a lab granulator (Bosch Mum), drying, and milling.

Comparative Example E—Crosslinked Cellulose Ether Synthesized With Epilox M 985

The same procedure, as described in Comparative Example D, was used in this example except that after PO was added to the reaction mixture and the reaction mixture was held for 10 min at 40° C., the crosslinking agent, Epilox M 985 (0.0030 mol/mol), was added into the autoclave reactor.

Inventive Example 2—Crosslinked Cellulose Ether Synthesized With Epilox M 985

Ground cellulose flock (1.5 mol) was added to a 5 L autoclave. After purging the autoclave thrice with $N_2$, the reactor was heated to 40° C. Then, DME (4.7 mol/mol AGU) and MCl 1 (3.2 mol/mol AGU) were added into the autoclave. NaOH 1 (strength 50 wt %, 1.9 mol NaOH/mol AGU) was added to the autoclave in the following 3 parts: (1) 50% (0.95 mol NaOH/mol AGU) in 3 portions during 2 min at a temperature of 40° C.; (2) 25% as an emulsion with 0.003 mol/mol crosslinking agent with a separate dosage device (bypass); and (3) 25% as cleaning step with the dosage device. Then, the resulting reaction mixture was held at 40° C. for 30 min PO (0.45 mol/mol AGU) was then added to the reaction mixture; and the reaction mixture was held for 10 min at 40° C.

The resultant mass was heated to 80° C. in 45 min. At 80° C., MCl 2 (1.3 mol/mol AGU) was injected quickly into the mass. Afterwards, NaOH 2 (0.67 mol/mol AGU) was added in 7 portions over 30 min followed by a 70 min cook-off time at 80° C. After the 70-min cook-off time, the resulting XCE product was formed. The resulting XCE product was then subjected to the following process steps using conventional procedures known in the art: hot water washing, neutralization with formic acid, granulation using a lab granulator (Bosch Mum), drying, and milling

TABLE III

| Example No. | Dosage (mol/mol AGU) | Crosslinking Agent | Process Step | Viscosity (mPa · s @2.52 s$^{-1}$ 1% Aqueous Solution) |
| --- | --- | --- | --- | --- |
| Comparative Example D | — | none | — | 8,350 |
| Comparative Example E | 0.003 | Epilox M 985 | during etherification | 8,580 |
| Inventive Example 2 | 0.003 | Epilox M 985 | during alkalization | 10,700 |

The results of carrying out the above Comparative Examples D and E and Inventive Example 2 are described in Table III. Similar to the Comparative Examples A-C and Inventive Example 1 described above using HEMC, the results summarized in Table III show the same observations in Comparative Examples D and E and Inventive Example 2 using HPMC. Since the pulp material used in the Examples described in Table III was different than the pulp material used in the Examples described in Table II, the non-crosslinked HPMC (Comparative Example D) has a 1% aqueous viscosity of 8,350 mPa·s. When Epilox M 985 was added to the process during the etherification step, the viscosity of the XCE (Comparative Example E) increased slightly. However, when Epilox M 985 crosslinking agent was added to the process of the present invention during the alkalization step, the viscosity (10,700 mPa·S) of the XCE of the present invention (Inventive Example 2) increased more pronouncedly than the other Comparative Examples D and E.

What is claimed is:

1. A process for producing a crosslinked cellulose ether comprising the steps of:
   (i) contacting at least one cellulose material with a mixture comprising (ia) at least one crosslinking agent and (ib) at least one alkalization reagent to form an activated cellulose material; and
   (ii) contacting the activated cellulose material of step (i) with at least one etherification reagent; wherein the at least one etherification reagent reacts with the activated cellulose material to form the crosslinked cellulose ether;

wherein the at least one crosslinking agent is a diglycidyl ether type crosslinking agent having the following chemical Structure (I):

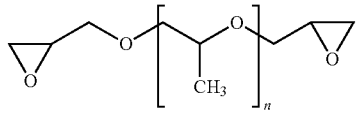

wherein n is selected from 3 to 25; and wherein the crosslinked cellulose ether is a water soluble crosslinked cellulose ether.

2. A process for producing a crosslinked cellulose ether comprising the steps of:
   (A) mixing (a) at least one crosslinking agent with (b) at least one alkalization reagent to form a crosslinking agent/alkalization reagent mixture;
   (B) contacting at least one cellulose material with the mixture of step (A) to form an activated cellulose material; and
   (C) contacting the activated cellulose material of step (B) with at least one etherification reagent; wherein the at least one etherification reagent reacts with the activated cellulose material to form the crosslinked cellulose ether, wherein the at least one crosslinking agent is a diglycidyl ether type crosslinking agent having the following chemical Structure (I):

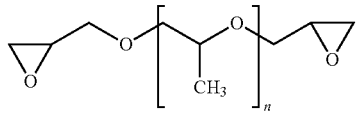

wherein n is selected from 3 to 25; and wherein the crosslinked cellulose ether is a water soluble crosslinked cellulose ether.

3. The process of claim 1 or claim 2, further including the step of subjecting the crosslinked cellulose ether to one or more steps of purifying, washing, drying, granulating, and milling.

4. The process of claim 1, wherein the activated cellulose material forms at a pressure of less than or equal to 500 kilopascals and at a temperature of less than or equal to 50° C.

5. The process of claim 1, wherein the crosslinked cellulose ether forms at a pressure of greater than or equal to 1,000 kilopascals and at a temperature of greater than 70° C.

6. The process of claim 1,

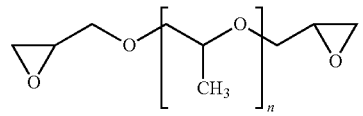

wherein the at least one alkalization reagent is selected from the group consisting of sodium hydroxide, potassium hydroxide, lithium hydroxide, and mixtures thereof in a solution.

7. The process of claim 1, wherein the at least one cellulose material is selected from the group consisting of wood pulp, cotton linters, and mixtures thereof; and wherein the at least one etherification reagent is selected from the group consisting of ethylene oxide, propylene oxide, butylene oxide, methyl chloride, ethyl chloride, and mixtures thereof.

8. The process of claim 1, wherein step (i) and step (ii) are carried out in an inert atmosphere.

9. The process of claim 1, wherein the at least one crosslinking agent is present in the mixture of step (i) at a concentration of from 0.0001 mole of the crosslinking agent per mole of anhydroglucose units of the cellulose ether to 0.05 mole of the crosslinking agent per mole of anhydroglucose units of the cellulose ether; and wherein the at least one alkalization reagent is present in the mixture of step (i) at a concentration of from 1 mole of alkalization reagent per mole of anhydroglucose units of the cellulose material to 3.5 moles of alkalization reagent per moles of anhydroglucose units of the cellulose material to form the activated cellulose material.

10. The process of claim 1, further including the step of grinding the at least one cellulose material to form a ground cellulose flock material; and wherein the grinding step is carried out prior to contacting the at least one cellulose material with the mixture of step (i).

* * * * *